United States Patent
Thomann

(10) Patent No.: US 11,708,940 B2
(45) Date of Patent: Jul. 25, 2023

(54) PROCESS OF PRODUCING A BOOM PART AS WELL AS A BOOM AND A BOOM PART OR BOOM PRODUCED THEREWITH

(71) Applicant: Mavig GmbH, Munich (DE)

(72) Inventor: Hendrik Thomann, Erlangen (DE)

(73) Assignee: MAVIG GMBH, Munich (DE)

( * ) Notice: Subject to any disclaimer, the term of this patent is extended or adjusted under 35 U.S.C. 154(b) by 358 days.

(21) Appl. No.: 17/016,922

(22) Filed: Sep. 10, 2020

(65) Prior Publication Data
US 2021/0071812 A1    Mar. 11, 2021

(30) Foreign Application Priority Data
Sep. 11, 2019  (DE) .......................... 102019213829.2

(51) Int. Cl.
| | | |
|---|---|---|
| *F16S 3/04* | (2006.01) | |
| *B23P 19/04* | (2006.01) | |
| *B21D 51/06* | (2006.01) | |
| *B21D 53/00* | (2006.01) | |
| *F16M 13/02* | (2006.01) | |
| *E02F 3/38* | (2006.01) | |
| *B66C 23/64* | (2006.01) | |

(52) U.S. Cl.
CPC ................ *F16S 3/04* (2013.01); *B21D 51/06* (2013.01); *B21D 53/00* (2013.01); *B23P 19/04* (2013.01); *B66C 23/64* (2013.01); *E02F 3/38* (2013.01); *F16M 13/022* (2013.01); *F16M 2200/06* (2013.01); *Y10T 29/49631* (2015.01)

(58) Field of Classification Search
CPC .. Y10T 29/49631; B21D 51/06; B21D 53/00; B21D 53/88; H05K 5/02; H05K 5/0208
See application file for complete search history.

(56) References Cited

U.S. PATENT DOCUMENTS

| | | | | |
|---|---|---|---|---|
| 1,445,850 A | * | 2/1923 | Schaefer .................. | F16C 7/02 |
| | | | | 74/579 R |
| 1,660,158 A | * | 2/1928 | Goldsmith ............. | B21D 53/88 |
| | | | | 74/543 |
| 2,077,454 A | * | 4/1937 | Almdale ................ | B21D 53/88 |
| | | | | 280/787 |
| 3,157,388 A | * | 11/1964 | Nelson ................ | E04H 17/1413 |
| | | | | 29/897.3 |
| 3,795,038 A | * | 3/1974 | Brezinski ............... | B62D 1/195 |
| | | | | 29/417 |

(Continued)

FOREIGN PATENT DOCUMENTS

| | | |
|---|---|---|
| DE | 10054802 A1 | 6/2002 |
| DE | 102006028713 B2 | 11/2007 |

*Primary Examiner* — Jason L Vaughan
(74) *Attorney, Agent, or Firm* — Scully, Scott, Murphy & Presser, P.C.

(57) ABSTRACT

The present invention relates to a process of producing a boom part from a sheet metal blank, in particular a process of producing a boom part having a bearing seat, in which the starting material is merely formed by bending. Thus, the production process is simplified. In addition, the present invention relates to a process of producing a boom that is closed at both ends by joining two boom parts produced by means of the process of the present invention. Furthermore, the present invention comprises boom parts and booms which are produced by means of one of the processes according to the present invention.

19 Claims, 3 Drawing Sheets

(56) References Cited

U.S. PATENT DOCUMENTS

| | | | | |
|---|---|---|---|---|
| 4,236,473 | A * | 12/1980 | Belt | B21D 47/01 |
| | | | | 29/897.35 |
| 6,192,584 | B1 * | 2/2001 | Gundlach | B60R 19/34 |
| | | | | 29/897.3 |
| 8,061,034 | B2 * | 11/2011 | Mellis | B21D 53/88 |
| | | | | 72/168 |
| 8,291,595 | B2 * | 10/2012 | Runte | F16C 7/08 |
| | | | | 29/897.2 |
| 10,596,870 | B2 * | 3/2020 | Kimura | B21D 5/01 |
| 2004/0135337 | A1 * | 7/2004 | Alesso | B60G 7/001 |
| | | | | 280/124.134 |
| 2006/0096099 | A1 * | 5/2006 | Cripsey | B21D 53/88 |
| | | | | 293/133 |
| 2020/0338624 | A1 * | 10/2020 | Froehlich | B21D 5/004 |

* cited by examiner

PROCESS OF PRODUCING A BOOM PART AS WELL AS A BOOM AND A BOOM PART OR BOOM PRODUCED THEREWITH

FIELD OF THE INVENTION

The present invention relates to a process of producing a boom part from a sheet metal blank, in particular, a process of producing a boom closed on both sides, as well as to a boom part produced according to the process and a boom produced according to the process.

STATE OF THE ART

The production of boom parts and booms, particularly boom parts and booms having at least one bearing seat, generally comprises several forming process steps in which various forming processes, such as bending, deep drawing, pressing, etc. are used to bring the starting material into the desired shape.

Up to now, booms have been produced from a square profile and a piece of pipe, which, for example, are bolted, pinned or welded together. However, these connections can be made incorrectly, which can lead to the risk of material failure.

DE 10 2006 028 713 B3 describes a process of producing a sheet metal control arm with a U-shaped cross-section for an automobile multi-link axle. In this process, a first leg of the U-profile is formed by deep drawing, pressing and bending, and holes for bearing eyes are punched at its ends. The edges of the holes are bent outwards and form the bearing support surfaces of the bearing eyes.

DE 100 54 802 C2 describes a process of producing a dimensionally stable joint part. For this purpose, recesses are punched out at the ends of a sheet metal plate, from which openings with projections are formed by means of a drawing device. Subsequently, the sheet metal plate is bent around an axis so that the openings at the ends are brought into contact with each other.

It is the object of the present invention to provide a process which makes it possible to produce a boom part, in particular a boom part with a bearing seat, from a sheet metal blank by bending, and a boom produced by means of said process. The boom according to the present invention is made from one piece, thereby increasing the stability of the boom.

BRIEF DESCRIPTION OF THE INVENTION

The object is achieved with the independent patent claims. The dependent claims relate to further aspects of the present invention.

According to a first aspect, the present invention relates to a process of producing a boom part from a sheet metal blank, which comprises three successive sections, a first, a second and a third section, wherein the second section is arranged in the longitudinal direction substantially centrally between the first and the third section, wherein the width of the second section is smaller than the width of the first and the third section, wherein the length of the second section is preferably smaller than the length of the first and third section, and wherein the first and third section have lateral portions which, in the width direction, project beyond the second section. The process according to the present invention comprises the following steps: bending the lateral portions of the first and the third section by 90 degrees about a line parallel to the longitudinal direction to form a U-shaped profile, and bending the second section about a line parallel to the width direction so that the bent lateral portions of the first and the third section face each other to form a hollow profile, the so-called boom part.

The sheet metal blank is preferably made of steel. More preferably, the sheet metal blank is made of steel that can be cold-formed. The ratio of the width of the first and/or third section of the sheet metal blank to the width of the second section of the sheet metal blank is preferably between 1.5:1 and 10:1, more preferably between 2:1 and 3:1. The ratio of the length of the first and/or third section of the sheet metal blank to the length of the second section of the sheet metal blank is preferably between 2:1 and 50:1, more preferably between 3:1 and 10:1.

Furthermore, the width of the first section of the sheet metal blank is preferably equal to the width of the third section of the sheet metal blank. Furthermore, the length of the first section of the sheet metal blank is preferably equal to the length of the third section of the sheet metal blank.

The bending of the second section of the sheet metal blank is preferably performed by means of a bending profile which is moved relative to a bending die. Preferably, the bending profile has a semicircular cross-section. The bending die is preferably U-shaped.

According to one aspect of the invention, the opposing, bent, lateral areas are preferably joined together, e.g. by welding, preferably laser welding. Furthermore, it is preferable to trim surface irregularities of the boom part so that preferably a smooth continuous surface of the boom part is created.

According to one aspect of the invention, a connecting profile is preferably attached to an open end of the boom part so that, in the longitudinal direction, a part of the connecting profile protrudes beyond the open end of the boom part. Preferably, the connecting profile is attached on the inside of the boom part. The connecting profile is preferably a hollow profile. The length of the connecting profile is preferably between 10% and 180% of the length of the boom part. The connecting profile overlaps the boom part in the longitudinal direction. The overlap is preferably between 5% and 90% of the length of the boom part.

According to another aspect of the invention, two boom parts produced according to the process described above are joined to form a boom closed on both ends. Preferably, the open end of a first boom part is connected to the free end of a connecting profile arranged at an open end of a second boom part. The connection is preferably made by welding. More preferably, the connection is made by laser welding. Preferably, the connecting profile runs inside the first and/or the second boom part. It is preferable to trim surface irregularities so that preferably a smooth, continuous surface of the boom closed on both sides is created.

Furthermore, a bearing seat is preferably produced at at least one closed end of the boom part closed on both ends or the boom, preferably by a material-removing process. Particularly preferably, the bearing seat is produced by milling. Furthermore, at least one cable is preferably inserted in the hollow inner part of the boom part or the boom closed on both sides. In addition, a bearing is preferably mounted to the bearing seat of the boom part or to the boom closed on both ends. Preferably, the mounting is made by means of a bush and securing rings.

The bearing preferably protrudes in at least one spatial direction over at least one outer surface of the boom part and/or the boom closed on both sides. Alternatively, the bearing does not protrude over an outer surface of the boom part or boom.

BRIEF DESCRIPTION OF THE FIGURES

The invention is explained in more detail based on the attached figures. The figures show.

DETAILED DESCRIPTION OF THE INVENTION

Figure 1:
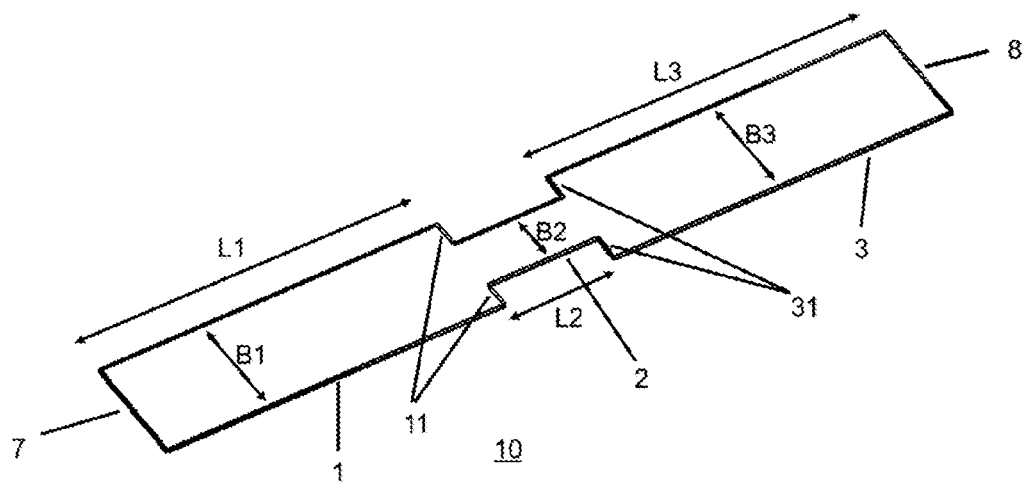
FIG. 1: A schematic view of the sheet metal blank for the production of a boom part according to the process of the present invention.

FIG. 1 shows a sheet metal blank 10 for the production of a boom part. The sheet metal blank consists of three successive sections, a first section 1, a second section 2 and a third section 3, which lie within two ends 7, 8. The first section 1 has a width B1 and a length L1. The second section 2 has a width B2 and a length L2. The third section 3 has a width B3 and a length L3. In the longitudinal direction, the second section 2 is arranged substantially centrally between the first section 1 and the third section 3. The width of the second section B2 is smaller than the width of the first and third sections B1, B3.

As further shown in FIG. 1, the first section 1 and the third section 3 have lateral portions 11, 31 which, in the width direction, protrude beyond the second section 2 on both sides. Furthermore, the length of the second section L2 is preferably smaller than the length of the first and third sections L1, L3.

The sheet blank 10 is preferably made of steel. More preferably, the sheet metal blank is made of a steel that can be cold-formed. The ratio of the width of the first or the third section B1, B3 to the width of the second section B2 is preferably between 1.5:1 and 10:1. The ratio of the length of the first or the third section L1, L3 to the length of the second section L2 is preferably between 2:1 and 50:1. Furthermore, the width of the first section B1 is preferably equal to the width of the third section B3. Additionally, or alternatively, the length of the first section L1 is preferably equal to the length of the third section L3.

Figure 2:
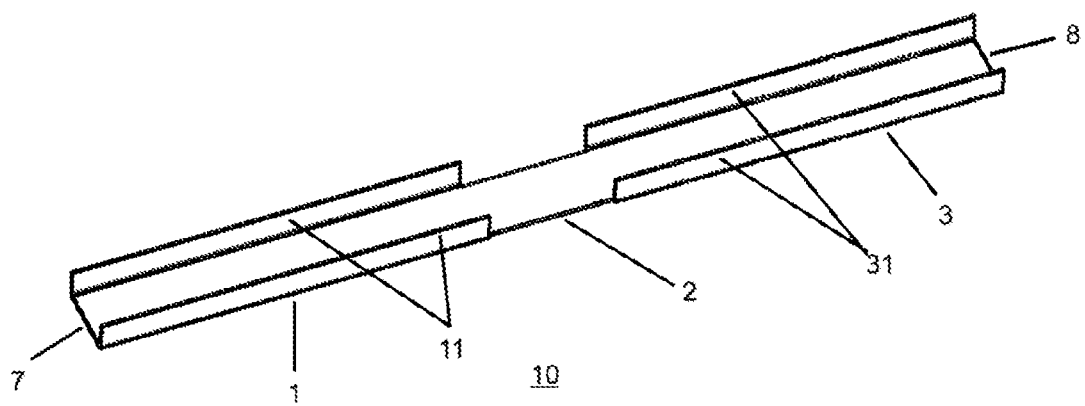
FIG. 2: A schematic view of the sheet metal blank for the production of a boom part after a first process step.

The present invention relates to a process of producing a boom part from a sheet metal blank 10. The process comprises the following steps a) and b): a) bending the two lateral regions 11, 31 of the first and third sections 1, 3 at an angle of 45 degrees to 90 degrees, preferably 90 degrees, about a line parallel to the longitudinal direction to form a U-shaped profile (see FIG. 2), and b) bending the second section 2 about a line parallel to the width direction so that the bent lateral portions 11, 31 of the first and the third section 1, 3 face each other to form a hollow profile 100 (see FIG. 3).

Figure 3:
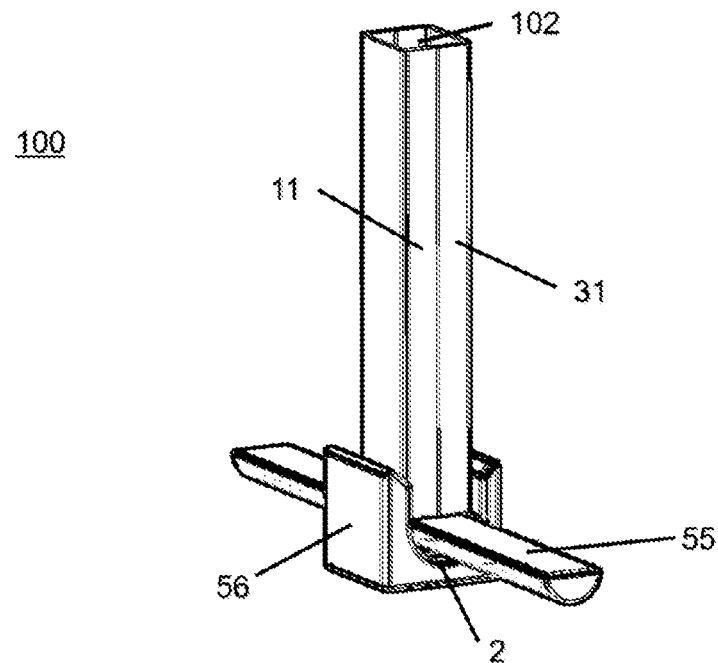
FIG. 3: A schematic view of the boom part after a further process step.

As shown in FIG. 3, the bending of the second section 2 is preferably performed by means of a bending profile 55, which is moved relative to a bending die 56 and thus moves the lateral portions 11, 31 of the sheet metal blank 10 towards each other to form a hollow profile 100. The bending profile 55 preferably has a semicircular cross-section. The bending die 56 is preferably U-shaped. The hollow profile 100, hereinafter referred to as boom part 100, has an open end 102 and a closed end 101 (see FIG. 4).

Figure 6:
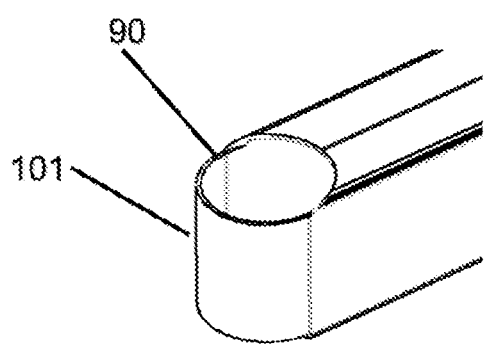
FIG. 6: A schematic view of a boom part or a boom with bearing seat at the closed end after a further process step.

At the closed end 101 of the boom part 100, a bearing seat 90 is preferably produced by a material-removing procedure (see FIG. 6). Particularly preferably, the bearing seat 90 is produced by milling A bearing is preferably attached to the bearing seat 90. For this purpose, the bearing seat 90 is preferably provided with a bush in which the bearing is attached with securing rings. Furthermore, before attaching of the bearing, preferably at least one cable is inserted into the hollow inner part of the boom part 100.

The bearing preferably protrudes in at least one spatial direction beyond at least one outer surface of the boom part 100. Alternatively, the bearing does not protrude beyond the outer surfaces of the boom part 100.

The process according to the present invention preferably further comprises the step of joining together the bent lateral portions 11, 31 facing each other. This is preferably done by welding, particularly preferably by laser welding. Subsequently, surface irregularities of the boom part 100 are preferably trimmed, preferably by milling, grinding or a suitable material-removing procedure, so that preferably a smooth, continuous surface of the boom part 100 is created.

Figure 4:
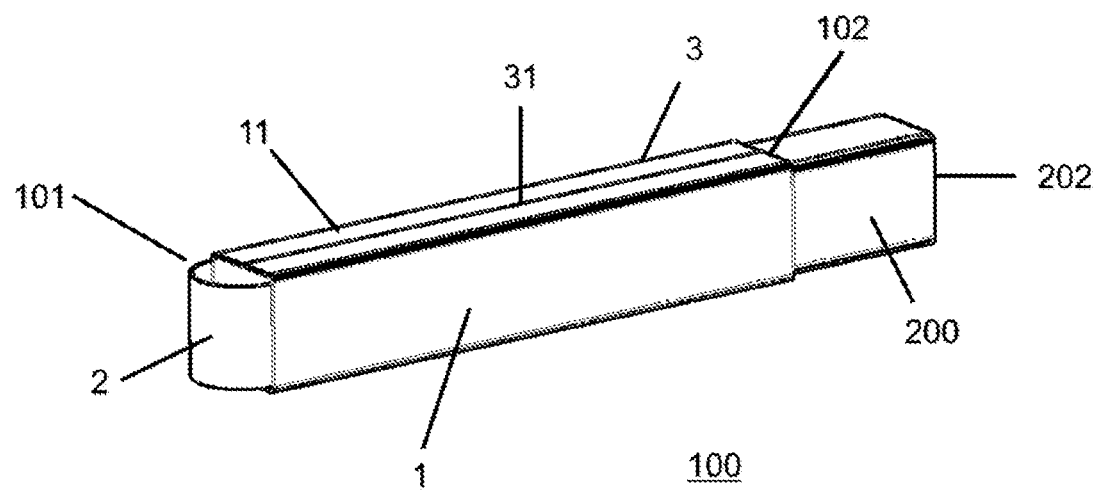
FIG. 4: A schematic view of the boom part after a further process step.

Furthermore, a connecting profile 200 is preferably attached to an open end 102 of the boom part 100 (process step d)) in such a way that part of the connecting profile 200 protrudes beyond the open end 102 of the boom part 100 in the longitudinal direction. The connecting profile 200 is preferably a hollow profile. The connecting profile 200 preferably runs inside the boom part as shown in FIG. 4. Alternatively, the connection profile 200 is attached outside the boom part. The connection profile 200 is preferably attached to the open end 102 of the boom part by welding. More preferably, the connecting profile 200 is attached to the open end 102 of the boom part by laser welding.

The length of the connection profile 200 is preferably between 10% and 180% of the length of the boom part 100, more preferably between 30% and 80% and especially preferably between 40% and 60%. The connecting profile 200 overlaps the length of the boom part 100 in the longitudinal direction preferably between 5% and 90% of the length of the boom part and protrudes with its free end 202 beyond the open end 102 of the boom part 100. Particularly preferably, the connecting profile 200 overlaps the length of boom part 100 in the longitudinal direction between 25% and 75% of the length of the boom part 100.

Figure 5:
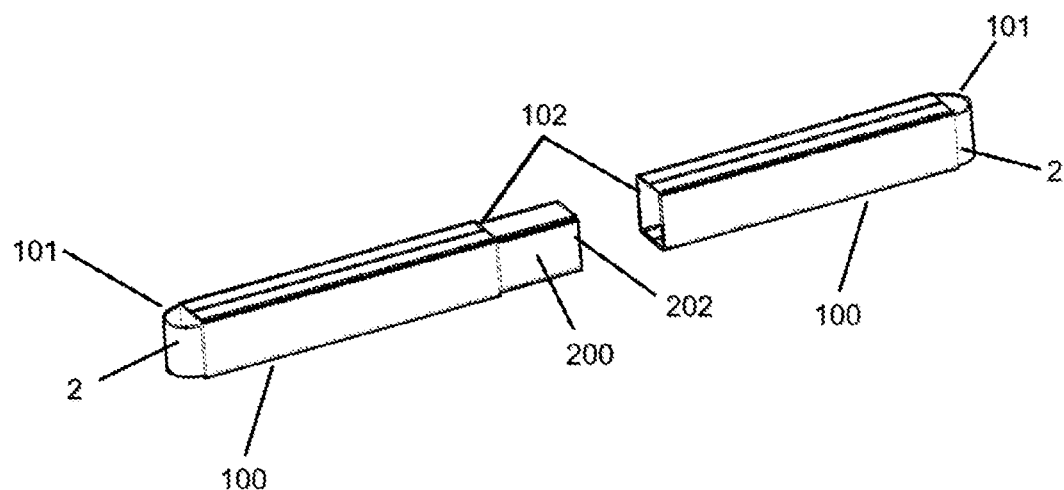
FIG. 5: A schematic view of two boom parts before they are connected to form a boom closed on both ends.
Figure 7:
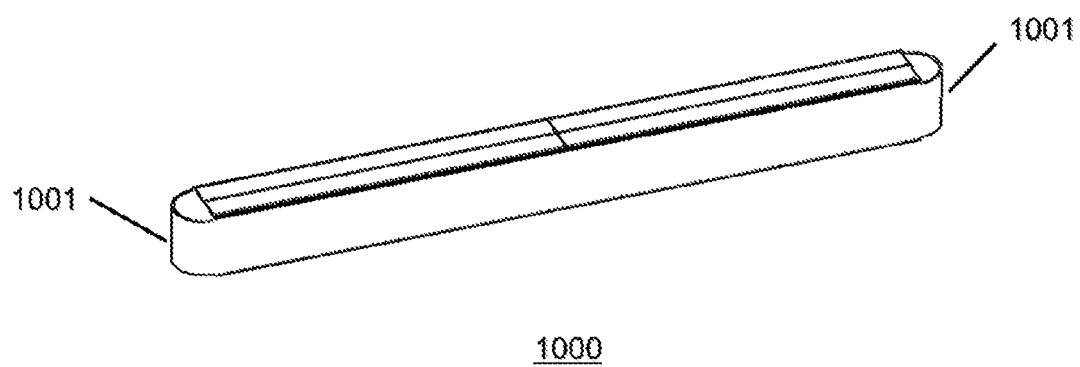
FIG. 7: A schematic view of a boom closed on both ends after a further process step.

According to another aspect, the present invention comprises a process of producing a boom part 1000 closed at both ends with two closed ends 1001 (see FIG. 7). In this process, two boom parts 100, each of which was made from a sheet metal blank 10, as described above, are joined together. As illustrated in FIG. 5, the boom 1000 closed at both ends is preferably produced by connecting the open end 102 of a first boom part 100 with the free end 202 of a connecting profile 200, which is attached to the open end 102 of a second boom part 100. Preferably, the connecting profile 200 runs inside the first and the second boom part 100. Furthermore, the connecting profile 200 overlaps in the longitudinal direction at least partially with the two boom parts 100. Preferably, the overlap of the connecting profile 200 with the boom parts 100 is between 5% and 100% of the length of the connecting profile 100. Particularly preferably, the overlap of the connecting profile 200 with the boom parts 100 is 100% of the length of the connecting profile 200, so that the connecting profile 200 lies completely inside the boom 1000 closed at both ends.

The two boom parts 100 are preferably joined to the connecting profile 200 and/or to each other by welding. Particularly preferably, the two boom parts 100 are joined to the connecting profile 200 and/or to each other by laser welding. After joining of the two boom parts 100 to form a boom 1000 closed on both sides, the boom 1000 closed on both sides is preferably smoothened, so that preferably a smooth, continuous surface of the boom 1000 closed on both sides is achieved.

At at least one closed end 1001 of the boom 1000 closed at both ends, preferably a bearing seat 90 is formed, as shown analogously in FIG. 6. This is preferably done by a material-removing procedure. Particularly preferably, the bearing seat is made by milling A bush for a bearing is preferably inserted into at least one bearing seat 90. Preferably, the bearing is attached to the bush by means of securing rings. Furthermore, before attachment of the bearing, cables are preferably inserted into the hollow inner part of the boom 1000.

The bearing preferably protrudes in at least one spatial direction beyond at least one outer surface of the boom 1000 closed on both sides. Alternatively, the bearing does not protrude beyond any outer surface of the boom 1000 closed on both sides.

According to the present invention, the process of producing a boom part, in particular a boom part with a bearing seat, as well as the process of producing a boom closed at both ends, in particular a boom closed at both ends with at least one bearing seat, makes it possible to produce boom parts and booms closed at both ends with different lengths in a simple way. For this purpose, no other forming processes apart from bending are necessary, which is advantageous for the efficiency of the production process.

According to the present invention, the boom part and/or the boom comprise(s) a bearing seat. The bearing seat does not need to be separately joined to the boom part and/or the boom, which reduces the risk of material failure. In particular, it is possible to dispense with further connecting elements, such as welding seams, screwed connections or pins, between the boom part and the connecting profile for connecting, which also has a positive effect on the safety and costs of the boom part and/or the boom.

Although the invention is represented and described in detail by means of the figures and the accompanying description, this representation and this detailed description are to be understood as illustrative and exemplary and not as limiting the invention. It is understood that skilled persons may make changes and modifications without leaving the scope of the following claims. In particular, the invention also includes embodiments with any combination of features mentioned or shown above with respect to various aspects and/or embodiments.

The present invention also comprises individual features in the figures even if they are shown in combination with other features and/or are not mentioned above.

Furthermore, the term "to comprise" and derivatives thereof does not exclude other elements or steps. Likewise, the indefinite article "a" or "one" and derivatives thereof does not exclude a plurality. The functions of several features listed in the claims may be fulfilled by a unit. The terms "substantially", "approximately", "about" and the like used in connection with a characteristic or a value in particular also define exactly the characteristic or the value. Any reference signs in the claims must not be understood as restricting the scope of the claims.

The invention claimed is:

1. A process of producing a boom part from a sheet metal blank,
   wherein the sheet metal blank has three successive sections, a first, a second and a third section, and the first, second and third sections each have a length and a width,
   wherein the second section is disposed substantially centrally between the first and third section in the longitudinal direction,
   wherein the width of the second section is smaller than the width of the first and third sections,
   wherein the length of the second portion is smaller than the length of the first and third sections, and
   wherein the first and third sections have lateral portions protruding widthwise beyond the second section; and
   the process of producing the boom part comprises the following steps:
   a) bending the lateral portions of the first and third sections about a line parallel to the longitudinal direction to form a U-shaped profile; and
   b) bending the second section about a line parallel to the width direction so that the bent lateral portions of the first and third sections face each other to form a hollow profile.

2. The process according to claim 1, wherein the bending of the second section is performed by means of a bending profile which is moved relative to a bending die.

3. The process according to claim 2, wherein the bending profile has a semicircular cross-section.

4. The process according to claim 1, which further comprises the step of:
   c) joining the bent, lateral regions facing each other.

5. The process according to claim 4, wherein said bent, lateral regions facing each other are joined by welding.

6. The process according to claim 1, wherein the sheet metal blank is made of steel.

7. The process according to claim 1, which further comprises the step of:
   d) attaching a connecting profile to the open end of the boom part so that a part of the connecting profile protrudes in the longitudinal direction beyond the open end of the boom part.

8. The process according to claim 7, wherein the connecting profile is located inside the first and second boom parts.

9. The process of producing a boom closed at both ends from two boom parts produced according to the process of claim 1, which further comprises the step of:
   e) joining together the two open ends of the two boom parts.

10. The process according to claim 9, wherein the two open ends of the boom parts are joined together by the following steps:
    e1) attaching a connecting profile to the open end of one of the two boom parts so that a part of the connecting profile protrudes in the longitudinal direction beyond the open end of the boom part,
    e2) attaching the open end of the other boom part to a free end of the connecting profile which projects beyond the open end of the one boom part.

11. The process according to claim 10, wherein the connecting profile is located inside the first and second boom parts.

12. The process according to claim 10, wherein the connecting profile is a hollow profile.

13. The process according to claim 9, wherein the joining of the boom parts to each other and the attachment of the connecting profile to the boom parts is performed by welding.

14. The process according to claim 1, further comprising the step of:
   f) trimming the surface irregularities by a material-removing procedure.

15. The process according to claim 14, wherein said trimming the surface irregularities by a material-removing procedure creates a smooth, continuous surface of the boom part or the boom.

16. The process according to claim 1, further comprising the step of:
   g) producing a bearing seat at the closed end of the boom part or the boom by a material-removing procedure.

17. The process according to claim 16, which further comprises the step of:
   h) inserting at least one cable into the hollow inner part of the boom part or the boom.

18. The process according to claim 16, further comprising the step of:
   i) attaching a bearing at the bearing seat of the boom part or the boom.

19. The process according to claim 18, wherein the bearing protrudes in at least one spatial direction beyond at least one outer surface of the boom part or the boom.

* * * * *